United States Patent [19]

Cronje et al.

[11] Patent Number: 4,985,150
[45] Date of Patent: Jan. 15, 1991

[54] WATER TREATMENT USING OXIDIZED COAL

[75] Inventors: Izak J. Cronje, Verwoerdburg; Johannes Dekker, Pretoria; Thomas E. Cloete, Pretoria, all of South Africa

[73] Assignee: National Energy Council, Pretoria, South Africa

[21] Appl. No.: 339,985

[22] Filed: Apr. 18, 1989

[30] Foreign Application Priority Data

Apr. 19, 1988 [ZA] South Africa ............... 88/2727

[51] Int. Cl.⁵ .............................................. C02F 1/42
[52] U.S. Cl. ..................................... 210/661; 210/687; 210/688; 210/694; 210/764; 210/800; 210/807; 502/433; 502/435
[58] Field of Search ............... 210/687, 688, 764, 694, 210/661, 800, 807; 502/433, 435, 431, 416

[56] References Cited

U.S. PATENT DOCUMENTS

| 1,497,543 | 6/1924 | Chaney | 502/433 |
| 1,499,908 | 7/1924 | Chaney | 502/432 |
| 1,793,670 | 2/1931 | Borrowman | 210/687 |
| 1,865,667 | 7/1932 | Bailleul | 502/433 |
| 1,913,340 | 6/1933 | Sanders | 502/433 |
| 2,008,146 | 7/1935 | Morrell | 502/433 |
| 2,031,711 | 2/1936 | Jaenicke et al. | 210/694 |
| 2,242,822 | 5/1941 | Fuchs | 502/416 |
| 2,339,742 | 1/1944 | Fuchs | 502/433 |
| 2,545,239 | 3/1951 | McQuiston, Jr. et al. | 210/688 |
| 2,620,926 | 12/1952 | Helbig et al. | 210/694 |
| 2,693,452 | 11/1954 | Goedkoop | 210/688 |
| 2,701,792 | 2/1955 | Owen | 210/694 |
| 3,066,099 | 11/1962 | Mohun | 502/435 |
| 3,424,676 | 1/1969 | Johnson et al. | 210/694 |
| 3,436,343 | 4/1969 | Smith | 210/694 |
| 3,436,344 | 4/1969 | Canning et al. | 210/694 |
| 3,539,467 | 11/1980 | Bozarth et al. | 502/435 |
| 3,840,476 | 10/1974 | Metrailer | 502/434 |
| 3,843,559 | 11/1974 | Repik et al. | 502/434 |
| 3,876,505 | 4/1975 | Stoneburner | 502/433 |
| 3,996,161 | 12/1976 | Chia | 210/694 |
| 4,007,116 | 2/1977 | Gappa et al. | 210/694 |
| 4,070,282 | 1/1978 | Otto | 210/688 |
| 4,093,541 | 6/1978 | Piccinini et al. | 210/688 |
| 4,105,549 | 8/1978 | Kakumoto et al. | 210/694 |
| 4,107,084 | 8/1978 | Repik et al. | 502/433 |
| 4,200,439 | 4/1980 | Lang | 48/202 |
| 4,336,237 | 6/1982 | Kudryk et al. | 210/688 |
| 4,444,666 | 4/1984 | Sato | 210/688 |
| 4,492,771 | 1/1985 | Hasegawa et el. | 502/433 |
| 4,746,442 | 5/1988 | Calemma et al. | 210/725 |

OTHER PUBLICATIONS

Smisek, *Active Carbon*, Elsevier Publishing Company, New York (1970), pp. 66–67.

*Primary Examiner*—Peter Hruskoci
*Assistant Examiner*—Cynthia L. Nessler
*Attorney, Agent, or Firm*—Cushman, Darby & Cushman

[57] ABSTRACT

Oxidized coal is used to remove dissolved or suspended matter from aqueous mediums. It is particularly effective in removing metal ions dissolved in aqueous mediums and/or bacteria from aqueous mediums.

12 Claims, No Drawings

WATER TREATMENT USING OXIDIZED COAL

BACKGROUND OF THE INVENTION

This invention relates to the treatment of aqueous mediums.

The treatment of polluted water whether it is of industrial or any other source for the removal of contaminating material, which may include dissolved metals and/or microorganisms, presents a problem. Such water may have to be purified before it can be discharged into the national water systems, or it may have to be purified for purposes of subsequent use.

SUMMARY OF THE INVENTION

It has been found that oxidized coal is an excellent material for use in the treatment of aqueous mediums to remove therefrom various dissolved or suspended matter. The invention thus provides, according to one aspect, the use of oxidized coal for this treatment.

Further according to the invention, there is provided a method of removing matter suspended or dissolved in an aqueous medium including the steps of loading the matter on oxidized coal in particulate form by contacting the medium with the coal and separating the loaded coal from the medium.

DETAILED DESCRIPTION OF THE INVENTION

The aqueous medium may be treated by the method of the invention for any one of a number of purposes. For example, the treatment may be designed to remove harmful contaminants from various waters such as industrial effluents, storm water, water needed for recirculation purposes in industry, water of river systems, sewage water and the like. In all instances, the oxidized coal, when contacted with the water, has the effect of removing various harmful contaminants dissolved or suspended therein. Such harmful contaminants include metals and microorganisms, particularly bacteria.

In one particular example of the invention, the oxidized coal is used to purify water for drinking purposes. For this use, the water will typically be passed through a bed containing the oxidized coal. The water will, for example, pass through the bed under the influence of gravity and on leaving the bed will generally have a purity suitable for drinking purposes.

The invention also has particular application to the use of oxidized coal in the removal of metals dissolved in an aqueous medium. In this use, the oxidized coal is brought into contact with the metal containing aqueous medium, and then separated from the medium after a desired amount of the dissolved, metal has been captured by or loaded on the oxidized coal. Although the action of the capture is not fully understood, it is believed to involve a combination of ion exchange, chelation adsorption, physical absorption and chemisorption.

A wide variety of metals may be removed from their solutions using the oxidized coal. For example, the metals may be of Group IIA, IIIA, IVA, VA, VIA, VIIA, VIIIA, IB, IIB, IIIB (including lanthanides and actinides), IVB, VB, VIB, VIIB and VIII of the Periodic Table.

The metal may be recovered from the loaded coal by ashing the loaded oxidized coal.

Contant between the aqueous medium and the oxidized coal may be achieved in any one of a number of ways. For example, the oxidized coal may be mixed with the aqueous medium in a settling tank or pond. The contact between the oxidized coal and aqueous medium may also take place in a filter bed, adsorption column or fluidized bed.

The contact time between the oxidized coal and the aqueous medium will depend on the nature of the medium, the matter dissolved or suspended therein, and the extent to which it is desired to load that matter on to the coal.

The particle size of the oxidized coal will normally not exceed 2000 microns. The particle size will be selected to meet the needs of a particular application. For example, if the contact between the aqueous medium and the coal is to take place in an adsorption column, relatively large particles, e.g. exceeding 200 microns, will generally be used to ensure an adequate flow rate through the column. Alternatively, if a settling pond or tank is to be used, then smaller particles with a larger surface area, for example, particles of the order of 10 microns, will typically be used.

The elemental analysis of the oxidized coal, expressed on a dry ash-free basis, will typically be:

| Element | Range % | Typical % |
| --- | --- | --- |
| Carbon | 59–78 | 68.9 |
| Hydrogen | 2.4–5 | 3.1 |
| Nitrogen | 1.0–3.8 | 1.7 |
| Oxygen | 14.4–33.6 | 5.8 |
| Sulphur | 0.2–8.0 | 0.5 |

The oxidized coal will contain functional acidic groups including carboxylic and phenolic groups. Typically, the oxidized coal will have the following functional group analysis (on an air dry basis):

| | Range (meq/g) | Typical Analysis (meq/g) |
| --- | --- | --- |
| Total acidity | 2.00–9.00 | 5.00 |
| Carboxylic groups | 0.02–5.00 | 3.09 |
| Phenolic groups | 2.00–5.00 | 2.91 |

The coal which is used to produce the oxidized coal may be of any type ranging from lignite to bituminous.

The coal may be oxidized in a dry or a wet state. The wet state oxidation is preferred.

DRY STATE OXIDATION

A typical example of a dry state oxidation involves oxidizing the coal with oxygen or a mixture of oxygen and nitrogen, particularly air, at a temperature between 120° and 350° C. at a partial pressure of oxygen between 0.1 and 10 atmospheres, preferably between 0.1 and 5 atmospheres, for a contact time between 15 and 600 minutes.

WET OXIDATION

A typical wet oxidation process is that described in European Patent Application No. 88306134.3. This wet oxidation involves mixing fine coal with an aqueous liquid medium to form a slurry having a pH between 4 and 9 and reacting the slurry with oxygen or air or a mixture of oxygen and air under suitable conditions of temperature and pressure and for a time sufficient to produce the oxidized product. Preferably, the slurry will have a pH of between 6 and 8, more preferably approximately 7.

The slurry preferably has a solids content, i.e. a content of coal particles, of between 5% and 70% by weight of the slurry. More preferably, the slurry has a solids content of approximately 10 to 60% by weight of the slurry.

The oxidation reaction is preferably carried out in a pressurized reactor such as an autoclave which may be a rotating autoclave or preferably an autoclave equipped with a stirrer.

The oxidizing agent may be pure oxygen, or air, or a mixture of oxygen and air. The preferred oxidizing agent is oxygen.

The oxidation step is preferably carried out at an elevated temperature of between 100° C. and 300° C.

The oxidation step is preferably carried out under elevated pressure which is sufficient to ensure substantial oxidation of the coal. Different types of coal, i.e. coal with different reactivities will require different pressures. Suitable pressures (at the elevated temperature) are pressures of between 0.1 and 10 MPa, more preferably 2 to 8 MPa.

The oxidation step is continued for a time sufficient to produce the oxidized product. Generally, the oxidation step will be carried out for a period of between 5 and 600 minutes, more preferably 20 to 60 minutes depending on the coal reactivity and the applied reaction conditions.

The product of the oxidation process is a mixture of oxidized coal, humic acids and fulvic acids. The fulvic acids report in the water and may be removed from the oxidized product by filtration. This leaves the solid oxidized coal containing a certain quantity of humic acids, the combination of which provides the product with its excellent water treatment characteristics. The oxidized product will generally be used in the wet state.

A typical example of producing the oxidized coal will now be described. 20 g of South African bituminous coal with a mean particle size of 10 microns was slurried in 400 ml water and quantitatively transferred to a stirred autoclave of 2 liter capacity. The autoclave was charged with oxygen to a pressure of 4.0 MPa (cold) and sealed. The turbine stirrer, running at 1500 rpm and the bar-type heaters were simultaneously started. The temperature was controlled at 200° C.±2° C. for a reaction period of one hour after which the reaction was terminated by cooling the reactor with a jet of compressed air and allowing the pressure to drop to atmospheric by opening a valve.

The slurry was removed from the reactor and filtered. The solid remaining on the filter was the oxidized coal containing humic acids and having the following elemental and functional group analysis.

| ELEMENTAL ANALYSIS (Dry Ash Free) | |
| --- | --- |
| Element | Percentage |
| Carbon | 68.9 |
| Hydrogen | 3.1 |
| Nitrogen | 1.7 |
| Oxygen | 25.8 |
| Sulphur | 0.5 |

| FUNCTIONAL GROUP ANALYSIS (Air Dried) | |
| --- | --- |
| | Amount (meq/g) |
| Total acidity | 5.00 |
| Carboxylic groups | 3.09 |

| FUNCTIONAL GROUP ANALYSIS (Air Dried) | |
| --- | --- |
| | Amount (meq/g) |
| Phenolic groups | 2.91 |

Oxidized coal having this elemental and functional group analysis was used in various water treatment experiments which will now be described.

In a similar way, oxidized coal of similar composition, but of larger particle size, can be prepared.

EXAMPLE I

The oxidized coal (10 micron) was used to remove various metals dissolved in an aqueous medium. The metals investigated were cadmium, aluminium, zinc, calcium, chromium, iron, copper, silver, mercury, lead, manganese, nickel and magnesium.

The method used was as follows:

To 100 ml of a 0.01 normal solution of the metal ion, 20 g of moist oxidized coal (containing 46% moisture) was added. The suspension was stirred for one hour at room temperature after which it was filtered. The concentration of the metal ion was determined (in both the original solution and in the filtrate by atomic absorption). The results obtained were as follows:

| | CONCENTRATION ($\mu$g/ml) | |
| --- | --- | --- |
| Metal ion | Original Solution | Filtrate |
| Cd | 1838 | 1014 |
| Al | 85 | 15 |
| Zn | 336 | 113 |
| Ca | 160 | 65 |
| Cr | 273 | 57 |
| Fe | 186 | 3 |
| Cu | 244 | 84 |
| Ag | 1058 | 217 |
| Hg | 914 | 415 |
| Pb | 1021 | 47 |
| Mn | 272 | 90 |
| Ni | 172 | 24 |
| Mg | 81 | 31 |

It is apparent from the above results that the oxidized coal was effective in substantially reducing the metal ion content of a variety of solutions containing relatively high concentrations of the metal ion.

EXAMPLE II

The ability of oxidized coal to remove copper from an aqueous medium was also determined using the method described in Example I. To 100 ml aliquots of copper sulphate solution (concentration 0.001 normal) portions of 0.5 g, 1 g, 4 g, 8 g and 16 g of moist oxidized coal (containing 46% moisture) were added. After stirring for one hours the suspensions were filtered. The concentration of copper was determined in both the original solution and in the filtrates by atomic absorption. The results obtained were as follows:

| Mass of Oxidised Coal (g) | Cu Concentration ($\mu$g/ml) |
| --- | --- |
| Nil | 24 |
| 0.5 | 2.25 |
| 1.0 | 1.10 |
| 2.0 | 0.68 |
| 4.0 | 0.62 |
| 8.0 | 0.59 |
| 16.0 | 0.54 |

EXAMPLE III

In this example, the oxidized coal was evaluated for its effectiveness as a bactericide in aqueous mediums.

Experimental Procedure (i) Column preparation

Five columns were prepared by packing 100 ml burettes (numbered 1 to 5) with the oxidized coal (200 to 425 μm) to levels of 12 ml, 17 ml, 29 ml, 38 ml and 42 ml respectively. The columns were kept under water for the duration of the experiment.

(ii) Test water

The final effluent from an activated sludge plant was used to filter through the column.

(iii) Flow characteristics

For each column, the time taken to filter a specific volume of water was determined. The time taken between contact with the column and first filtrate appearing, was also determined for each column.

(iv) Microbiological analysis of the water

The total aerobic plate count (TAPC) in order to determine the total number of viable bacteria was done using Plate Count Agar and an incubation temperature of 37° C. for 48 hours.

The Coliform count (CC) was conducted using the pour plate method employing Violet Red Bile Agar (VRB) and incubating at 37° C. for 48 hours.

(v) Microbiological analysis of the bacteria loaded oxidized coal

In order to determine whether the removal of bacteria from the contaminated water was merely filtration, it was considered necessary to do a TAPC on the loaded oxidized over a period of 24 hours at set intervals in order to determine whether the bacteria being filtered out were also killed.

The TAPC was conducted as in (iv) on 1 g of the loaded oxidized coal at intervals of 1 hour, 2 hours, 3 hours, 4 hours and 24 hours.

Results and Discussion (i) Microbiological analysis of the water

TABLE 1

TAPC after filtration of specific volumes of effluent through oxidized coal columns

| Volume/filtered | TAPC/ml:Column | | | | |
|---|---|---|---|---|---|
| | 1 | 2 | 3 | 4 | 5 |
| 20 ml | 0 | 0 | 0 | 0 | 0 |
| 50 ml (20 + 30 ml) | 0 | 0 | 0 | 0 | 0 |
| 100 ml (20 + 30 + 50 ml) | 0 | 0 | 0 | 0 | 0 |
| 200 ml (20 + 30 + 50 + 100 ml) | 0 | 0 | 0 | 0 | 0 |

Control TAPC (before filtration) $8.8 \times 10^5$ bacteria/ml

The results in Table I indicate that no bacteria passed through any of the columns.

TABLE II

Coliform numbers (CC) after filtration of specific volumes of effluent through oxidized coal columns

| Volume/filtered | TAPC/ml:Column | | | | |
|---|---|---|---|---|---|
| | 1 | 2 | 3 | 4 | 5 |
| 20 ml | 0 | 0 | 0 | 0 | 0 |
| 50 ml (20 + 30 ml) | 0 | 0 | 0 | 0 | 0 |
| 100 ml (20 + 30 + 50 ml) | 0 | 0 | 0 | 0 | 0 |
| 200 ml (20 + 30 + 50 + 100 ml) | 0 | 0 | 0 | 0 | 0 |

Control (before filtration) = $4.6 \times 10^2$ bacteria/ml

Again the results in Table II indicate that no bacteria passed through the columns.

(ii) Microbiological analysis of the loaded oxidized coal inside the column.

TABLE III

TAPC/g of loaded oxidized coal removed from the columns after a set period of time

| Time after filtration | Column | | | | |
|---|---|---|---|---|---|
| | 1 | 2 | 3 | 4 | 5 |
| 1 h | 0 | 0 | 0 | 0 | 0 |
| 2 h | 0 | 0 | 0 | 0 | 0 |
| 3 h | $1.08 \times 10^4$ | $5.0 \times 10^3$ | $5 \times 10^2$ | 0 | 0 |
| 4 h | $5 \times 10^2$ | $1.8 \times 10^3$ | $2 \times 10^2$ | 0 | 0 |
| 5 h | 0 | $2.5 \times 10^3$ | $1 \times 10^2$ | $1.0 \times 10^2$ | 0 |
| 24 h | 0 | 0 | 0 | 0 | 0 |

The results in Table III indicate that in Column 1, 2 and 3 bacteria were detected in the oxidized coal 3 hours after filtration was completed. These bacterial numbers were reduced in all three of these columns to zero levels after 24 hours (Table III). Bacteria were encountered only once in column 4 (after 5 hours) and absent altogether from column 5 (Table III). From these results it can be concluded that the oxidized coal not only removes bacteria from sewage effluent, but also kills these bacteria, if allowed a long enough contact time. The reason why fewer bacteria were encountered as the column got longer, is merely because of the fact that the same volume of water was passed over a larger surface area resulting in a lower number of organisms per unit volume and hence a more effective kill rate.

(iii) Flow characteristics

TABLE IV

Volume throughput of effluent per column per unit time

| | Time | | Column | | | | |
|---|---|---|---|---|---|---|---|
| | | | 1 | 2 | 3 | 4 | 5 |
| (i) | 20 ml | A | 8 sec | 14 sec | 16 sec | 20 sec | 29 sec |
| | | B | 2 min 3 sec | 2 min 10 sec | 2 min 33 sec | 6 min 18 sec | 6 min |
| (ii) | 30 ml | A | 2 sec | 2 sec | 3 sec | 6 sec | 2 sec |
| | | B | 2 min 27 sec | 2 min 55 sec | 3 min 17 sec | 3 min 46 sec | 6 min 10 sec |
| (iii) | 50 ml | A | 2 sec | 2 sec | 2 sec | 2 sec | 2 sec |
| | | B | 3 min 37 sec | 4 min 42 sec | 5 min 11 sec | 8 min 1 sec | 9 min 33 sec |
| (iv) | 100 ml | A | 2 sec | 2 sec | 2 sec | 2 sec | 2 sec |
| | | B | 5 min 6 sec | 6 min 45 sec | 7 min 46 sec | 11 min 2 sec | 14 min 20 sec |

A = Time between initial contact and first filtrate
B = Time to filter the specific volume indicated

We claim:
1. A method of removing matter suspended or dissolved in an aqueous medium including the steps of:

loading the matter onto oxidized coal in particulate form by contacting the medium with the coal and separating the loaded coal from the medium;

wherein the oxidized coal (expressed on a dry ash-free basis) has an elemental analysis such that the coal includes carbon in a range from 59% to 78%, hydrogen in a range of from 2.4% to 5%, nitrogen in a range of from 1.0% to 3.8%, oxygen in a range of from 14.4% to 33.6% and sulphur in a range of from 0.2% to 8.0%; and wherein the oxidized coal has a functional analysis such that total acidity is in a range of from 2.00 meq/g to 9.00 meq/g, carboxylic groups are in a range from 0.02 meq/g–5.00 meq/g and phenolic groups are in a range of from 2.00 meq/g to 5.00 meq/g.

2. A method according to claim 1 wherein the oxidized coal has a particle size of up to 2000 microns.

3. A method according to claim 1 wherein the elemental analysis of the oxidized coal (expressed on a dry ash-free basis) is:

| Element | Percentage |
| --- | --- |
| Carbon | 68.9 |
| Hydrogen | 3.1 |
| Nitrogen | 3.1 |
| Oxygen | 25.8 |
| Sulphur | 0.5 |

4. A method according to claim 1 wherein the oxidized coal has the following functional group analysis (on an air dry basis):

| | Analysis (meq/g) |
| --- | --- |
| Total acidity | 5.00 |
| Carboxylic groups | 3.09 |
| Phenolic groups | 2.91 |

5. A method according to claim 1 wherein the aqueous medium is contacted with the oxidized coal in a system selected from an adsorption column, a fluidized bed, a settling tank and a settling pond.

6. A method according to claim 1 wherein the matter to be removed is a metal dissolved in the aqueous medium.

7. A method according to claim 6 wherein the metal to be removed is selected from a metal of Groups IIA, IIIA, IVA, VA, VIA, VIIA, VIIIA, IB, IIB, IIIB (including lanthanides and actanides), IVB, VB, VIB, VIIB and VIII of the Periodic Table.

8. A method according to claim 6 wherein the metal to be removed is selected from cadmium, aluminium, zinc, calcium, chromium, iron, copper, silver, mercury, lead, manganese, nickel and magnesium.

9. A method according to claim 6 wherein the metal is recovered from the loaded oxidized coal by ashing the loaded oxidized coal.

10. A method according to claim 1 wherein the matter to be removed is microorganisms.

11. A method according to claim 10 wherein the microorganisms are bacteria.

12. A method according to claim 1 wherein the aqueous medium is selected from one of an industrial effluent, storm water, sewage water.

* * * * *